United States Patent
Vaudreuil

(10) Patent No.: US 10,199,826 B2
(45) Date of Patent: Feb. 5, 2019

(54) SYSTEM AND METHOD FOR COMBINING LOAD RESPONSE AND ENERGY STORAGE FOR GRID REGULATION

(71) Applicant: Mosaic Power, LLC, Frederick, MD (US)

(72) Inventor: Greg Vaudreuil, Frederick, MD (US)

(73) Assignee: Mosaic Power, LLC, Frederick, MD (US)

( * ) Notice: Subject to any disclaimer, the term of this patent is extended or adjusted under 35 U.S.C. 154(b) by 312 days.

(21) Appl. No.: 14/870,378

(22) Filed: Sep. 30, 2015

(65) Prior Publication Data
US 2016/0094032 A1 Mar. 31, 2016

Related U.S. Application Data

(60) Provisional application No. 62/057,469, filed on Sep. 30, 2014.

(51) Int. Cl.
*H02J 3/14* (2006.01)
*H02J 3/32* (2006.01)
*G05B 15/02* (2006.01)
*H02J 13/00* (2006.01)

(52) U.S. Cl.
CPC ........... *H02J 3/14* (2013.01); *G05B 15/02* (2013.01); *H02J 3/32* (2013.01); *H02J 13/0079* (2013.01); *Y02B 70/3225* (2013.01); *Y04S 20/222* (2013.01)

(58) Field of Classification Search
CPC ..... G05B 15/02; H02J 3/14; H02J 3/32; H02J 13/0079; Y02B 70/3225; Y04S 20/222
See application file for complete search history.

(56) References Cited

U.S. PATENT DOCUMENTS

| 7,715,951 B2 | 5/2010 | Forbes, Jr. et al. |
| 7,778,737 B2 | 8/2010 | Rossi et al. |
| 8,183,995 B2 | 5/2012 | Wang et al. |
| 8,255,090 B2 | 8/2012 | Frader-Thompson et al. |

(Continued)

FOREIGN PATENT DOCUMENTS

| CA | 2876355 A1 * | 12/2013 | ............. G05B 15/02 |
| EP | 0003010 A1 * | 7/1979 | ................ H02J 3/14 |
| WO | 2014137665 | 9/2014 | |

OTHER PUBLICATIONS

A. Al-Mulla et al., "Demand Management Through Centralized Control System Using Power Line Communication or Existing Buildings," Energy Efficiency Technologies Program, Kuwait Institute for Scientific Research, 2014 (available at http://www.sciencedirect.com/science/article/pii/S0196890413007875).

(Continued)

*Primary Examiner* — Jennifer L Norton
(74) *Attorney, Agent, or Firm* — Whiteford, Taylor & Preston, LLP; Gregory M. Stone

(57) ABSTRACT

An energy regulation system is provided that comprises a plurality of demand resources, a metering load controller for each demand resource on the plurality of demand resources, an energy modulator capable of consuming or producing additional power on demand, a system controller communicatively connected to the metering load controller, energy modulator, and an energy source, wherein the system controller manages the energy demand from the metering load controller, the energy modulator, and the energy source.

17 Claims, 5 Drawing Sheets

(56) References Cited

U.S. PATENT DOCUMENTS

| | | | |
|---|---|---|---|
| 8,401,709 B2 | 3/2013 | Cherian et al. | |
| 8,364,609 B2 | 8/2013 | Ozong | |
| 8,532,834 B2 | 9/2013 | Delong et al. | |
| 8,588,991 B1 | 11/2013 | Forbes, Jr. | |
| 8,719,125 B1 | 5/2014 | Forbes, Jr. | |
| 2003/0233201 A1* | 12/2003 | Horst | H02J 3/14 700/295 |
| 2004/0075343 A1 | 4/2004 | Wareham et al. | |
| 2005/0077881 A1* | 4/2005 | Capp | H02J 3/30 322/29 |
| 2007/0005192 A1 | 1/2007 | Schoettle et al. | |
| 2010/0088261 A1* | 4/2010 | Montalvo | H02J 3/14 706/15 |
| 2011/0196547 A1* | 8/2011 | Park | G06Q 50/06 700/296 |
| 2012/0065801 A1 | 3/2012 | Rossi et al. | |
| 2013/0046415 A1* | 2/2013 | Curtis | H02J 3/38 700/297 |
| 2013/0090777 A1 | 4/2013 | Lu et al. | |
| 2013/0213038 A1 | 8/2013 | Lazaris | |
| 2013/0218548 A1 | 8/2013 | Lazaris | |
| 2013/0226360 A1 | 8/2013 | Wilkins et al. | |
| 2013/0345884 A1 | 12/2013 | Forbes, Jr. | |
| 2014/0018969 A1 | 1/2014 | Forbes, Jr. | |
| 2014/0084682 A1 | 3/2014 | Covic et al. | |
| 2014/0214227 A1 | 7/2014 | Thornton et al. | |
| 2016/0274653 A1* | 9/2016 | Mydlil | G06F 1/26 |
| 2018/0254633 A1* | 9/2018 | Covic | H02J 3/14 |

OTHER PUBLICATIONS

David Crossley, "Smart Metering, Load Control and Energy-using Behaviour," Energy Futures Australia Pty Ltd., 2007 (available at http://www.ieadsm.org/Files/Content/5.Brugge_Crossley.pdf).

K.S. Reddy et al., "A Review of Integration, Control, Communication and Metering (ICCM) of Renewable Energy Based Smart Grid," Heat Transfer and Thermal Power Laboratory, Department of Mechanical Engineering, Indian Institute of Technology, Madras India, 2014 (avaialble at http://www.sciencedirect.com/science/article/pii/S1364032114003748).

Renerconsys, Digital Load Controller (DLC) for Induction Generation (IGC) & Synchronous Generator (ELC), 2008 (availalbe at http://www.renerconsys.com/DLC_Brosure_eng_08.pdf).

\* cited by examiner

US 10,199,826 B2

SYSTEM AND METHOD FOR COMBINING LOAD RESPONSE AND ENERGY STORAGE FOR GRID REGULATION

CROSS REFERENCE TO RELATED APPLICATION

This application is based upon co-owned U.S. Provisional Patent Application Ser. No. 62/057,469 entitled "System Combining Load Response and Energy Storage for Grid Regulation," filed with the U.S. Patent and Trademark Office on Sep. 30, 2014, the specification of which is incorporated herein by reference.

FIELD OF THE INVENTION

The present invention relates to the field of energy regulation, and more specifically to systems and methods for managing energy usage.

BACKGROUND

For modern electrical power grids, electrical demand load variability can have seriously negative effects, such as causing power consumption peaks that may threaten overall grid integrity, in turn leading to brownouts or service interruptions altogether. Thus, modern electrical power grids typically require services that manage their electrical loads so as to balance the supply and demand of electricity on the grid. Moreover, to properly manage those loads, it is desirable that such load balancing be performed in the shortest possible timeframes.

Efforts have been made to provide such load balancing service, such as by providing generation assets that vary the output of energy according to a control signal from a dispatcher, generating more electricity when there is a deficit or generating less energy when there is a surplus. However, such efforts can require extensive downstream monitoring and even the building of additional power generation resources to be able to adapt to variable demand.

It would therefore be desirable to provide a system that may positively affect the load balancing in a more contained environment of demand resources that would not be dependent upon changes to the existing supply system or its monitoring and load balancing infrastructure.

SUMMARY OF THE INVENTION

Demand resources, such as various household appliances, industrial equipment, and the like at the demand end of the power distribution network can themselves vary in electrical demand, such that they may be used to assist in the overall load balancing function by increasing consumption when there is a surplus, and curtailing consumption when there is an energy deficit. Thus, an energy regulation system is disclosed herein that comprises a plurality of demand resources, a metering load controller for each demand resource on the plurality of demand resources, an energy modulator capable of consuming or producing additional power on demand, a system controller communicatively connected to the metering load controller, energy modulator, and an energy source, wherein the system controller manages the energy demand from the metering load controller, the energy modulator, and the energy source. Such system, and the methods that it implements, provide a grid-attached environment of controlled power usage that can, in turn, provide an overall benefit to grid operation. More specifically, such system and method may control power usage in that environment so as to optimize usage when there is a surplus of available power, and to moderate usage when there is a deficit of power. By doing so, the environment may serve as a self-contained regulator that, through more efficient use of available power from the grid, reduces overall variability in energy usage in that environment so as to assist in overall load balancing on the power grid.

BRIEF DESCRIPTION OF THE DRAWINGS

The numerous advantages of the present invention may be better understood by those skilled in the art by reference to the accompanying drawings in which.

DETAILED DESCRIPTION OF THE PREFERRED EMBODIMENTS

The invention summarized above may be better understood by referring to the following description. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
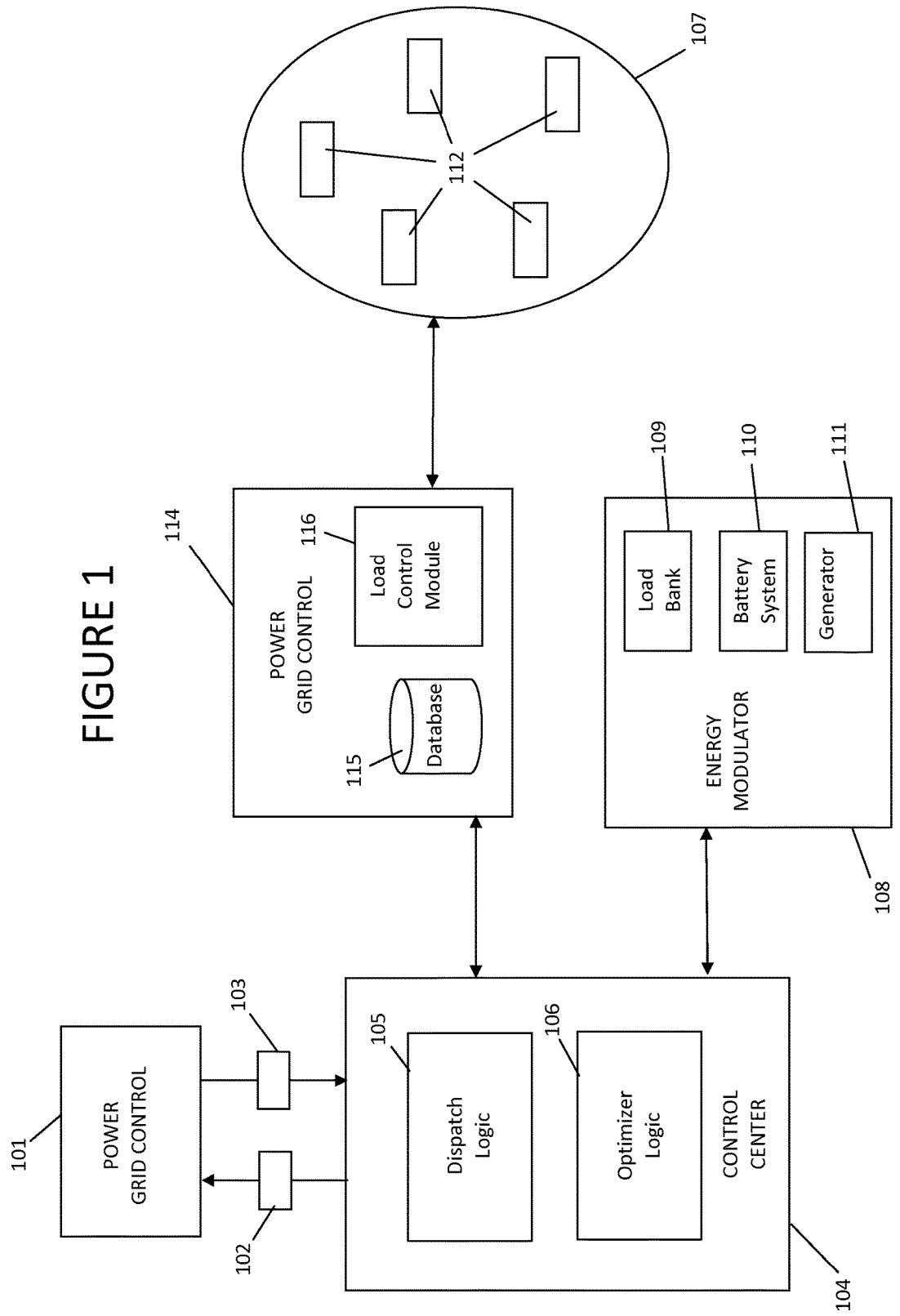
FIG. 1 is a schematic view of a system in accordance with certain aspects of an embodiment of the invention.

As illustrated in FIG. 1, one preferred embodiment provides a system for management of energy resources that includes a fleet 107 of demand resources 112, such as by way of non-limiting example residential water heaters, in communication with a metering load controller 114 (preferably including a database 115 storing information about demand resources 112 and a load control module 116 capable of powering demand resources 112 on and off), an energy modulator 108, a control center 104, and a power grid control 101. The control center 104 turns on or off the demand resources 112 within fleet 107 and changes the energy produced or absorbed by an energy modulator 108 to follow a control signal to 102 and from 103 the power grid control center 101.

A demand resource 112 is an energy consuming device that has a degree of flexibility as it relates to when it can be turned on or off based on normal operation, as evidenced by historical operation. In addition, the demand resource 112 can be controlled to consume power on demand. One common example is an electric resistance water heater that can be reheated asynchronously from the consumption of hot water. Other examples include home heating and cooling systems, clothes dryers, and refrigeration equipment, all of which have flexibility as to when they turn on or off within an acceptable temperature range.

An energy modulator 108 is a device configured to consumer and/or produce energy on demand, that allows control of the level of energy available to the system independently of end-user demand. Examples may include a generator 111 that can vary the production of energy, or a load bank 109 that can vary the level of consumption, or a battery system 110 that may vary the rate of charging or discharge so as to either consume energy (in the case of charging the battery) or generate energy (in the case of discharging the battery).

Both the fleet 107 of demand resources 112 and the energy modulators 108 are part of the same grid regulation service 100, and together respond to the grid control signal 102, 103. The output of the system is the combination of the outputs of both the fleet 107 of demand resources 112 and the energy modulators 108.

The control center 104 has two distinct functions: dispatch logic 105 and optimizer logic 106. The dispatch logic 105 commands demand resources 107 to turn on or off as necessary to accurately follow the grid dispatch signals 102, 103 while delivering an acceptable level of service to the demand resource (e.g., for a hot water heater, maintaining water heaters in a state allowing them to provide hot water on demand and avoiding excess time for reheating). The dispatch logic also allocates consumption to maximize the number of demand resources that remain in a less than fully heated condition and are available to be turned on. When the total amount of power consumed by the fleet 107 of demand resource 112 is below that required by the control center 104, additional demand resources 112 are turned on. When there is too much consumption by the fleet 107 of demand resources 112, some demand resources 112 are turned off. No change is made if the level of consumption by the fleet 107 of demand resources 112 is on target with the grid dispatch signals 102, 103.

When over a period of minutes, the energy level required by the control signal 102, 103 exceeds the aggregate power consumption of the underlying demand resources 107, the energy deficit will decrease. As used herein, "energy deficit" relates to a condition that exists when the system is requested to consume less energy than a baseline amount of energy over a period of time. Having the system consume less energy increases the energy deficit, in general resulting in a larger number of demand resources being available to be turned on; likewise, having the system consume more energy decreases the energy deficit, in general resulting in a smaller number of demand resources being available to be turned on.

Similarly, when the energy level required by the control signal is less than the aggregate power consumption of the underlying demand resources, the energy deficit will increase. Because both the energy required over time by the control signal and the energy consumed by the demand resources vary over time, an imbalance may result. This imbalance will result in an insufficient number of heaters that can be turned on, and impact the quality of service the system provides to the grid.

The optimizer logic 106 assists the dispatch logic 105 by ensuring that there is an appropriate energy deficit and indirectly, an adequate number of demand resources 112 that are available to be turned on by the dispatch logic 105. The optimizer logic 106 manages the energy over the short term by adding or removing energy from this system independent of grid control signals.

When there is an insufficient energy deficit, the optimizer logic 106 will direct the energy modulators 108 to increase energy consumption. In this way, the energy modulators 108 are both adding to the energy deficit and increasing the number of demand resources that can be turned on by consuming more power in lieu of turning on a demand resource 112. This same effect can be achieved by reducing energy production. Similarly, when the energy deficit is too large, and the number of demand resources 112 available to be turned on is too large, the optimizer logic 106 will direct the energy modulators to consume less energy, or produce more energy.

The optimizer logic 106 also controls the number of demand resources 107 to be turned on over the longer term by selecting an appropriate baseline consumption level around which the power grid control signal 102, 103 is determined. When the long-term average power demand (typically over a time on the order of hours) is higher than the demand that the control signal 102, 103 requires, the baseline is raised. When the longer term average power demand is lower, the baseline is lowered. If the longer term average power demand is as required, the baseline is unchanged.

The control center 104 sends a dispatch signal to vary energy consumption above or below a baseline level. When there is a need for more energy, the demand resources 107 are turned off, consuming less than the baseline. When there is too much energy, the demand resources 107 are turned on to absorb the surplus energy. To perform this, the resource being managed must be able to consume less than the usual, or baseline amount, and must be able to consume more than the usual amount when necessary.

The dispatch logic 105 computes which of the several demand resources 107 to be turned on and off in such a way as to balance the expected power requirements of a given demand resource 112 with the need to maintain an adequate number of demand resources 112 that are available to be turned on.

Figure 2:
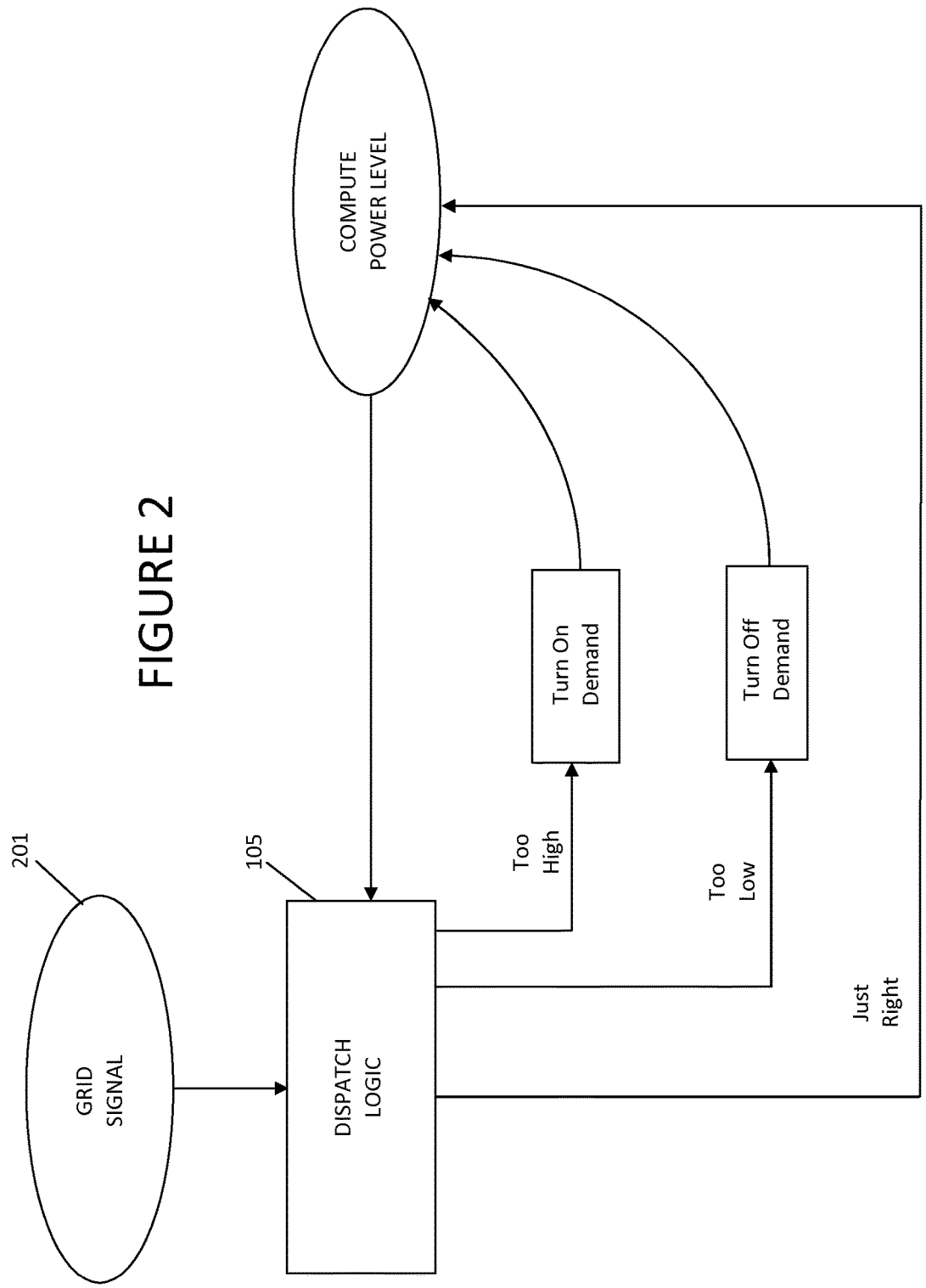
FIG. 2 is a logic flow diagram showing the dispatch of demand resources in response to the grid signals.

As shown in FIG. 2, the dispatch logic 105 controls power demand. When the total consumption of power is less than that requested from the grid signal 102, the dispatch logic 105 turns on additional demand resources 112. When the total consumption of power is more than that requested from the grid signal 201, the dispatch logic 105 turns off demand resources 112. When the total consumption of power is as requested from the grid signal 201, the dispatch logic 105 makes no changes.

To consume more than the usual amount, the demand resource 112 must be maintained in a state with a collective energy deficit. This deficit is created when the system is requested to consume less than the baseline amount of energy over a period of time. This is called the depth of the deficit. However, a collective energy deficit is not sufficient to ensure that there are enough demand resources 112 to turn on. There may be very few demand resources 112 with a deep deficit and many with shallow or no energy deficit. In such a case, an insufficient number of demand resources 112 may be available to provide the required level of demand. For example, to regulate 1 MW of power, a system with 1 MW average consumption must be able to surge to a peak consumption of 2 MW and curtail to 0 MW. To surge to 2 MW, there must be a sufficient number of demand resources 112 available that are less than fully heated. Using an example of typical residential electric water heaters, 2 MW of peak demand can be met by turning on 900 heaters.

Dispatcher logic 105 ensures that those demand resources 112 that require the most energy are turned on first in order to maintain a sufficient number of demand resources 112 that can be turned on. Those demand resources 112 with lowest usage are reserved to be turned on only when the highest consumption is required. Dispatch logic 105 assigns a priority to each demand resource 112 based on historical consumption and possibly other factors (as may be apparent to those skilled in the art) for the relevant time-period. This algorithm prioritizes demand resources 112 in order of their expected energy use, turning on demand resources 112 that have the highest energy deficit and deferring turning on those that have the lowest deficit.

This prioritization scheme can be optimized to improve performance. The usage by a demand resource 112 during any particular interval never exactly matches predictions, and the grid control signal 102, 103 may require more or less energy consumption than the baseline level for those same intervals. When the energy demands of the grid and the energy demands of the fleet 107 of demand resources 112 differ, the prioritization scheme will accumulate too large or too small a collective energy deficit in the fleet 107 of demand resources 112. When the usage is above that required by the grid, there will be too shallow an energy deficit and too few of those resources able to turn on when needed. Similarly, if the required energy consumption is below that which is required by the grid, then the energy deficit will grow too large and the end needs of the demand resource will not be met.

Because the grid balancing service relies upon a large number of demand resources 112, each with a shallow energy deficit, the system is very sensitive to the overall energy deficit. A small change in the energy deficit may result in a large change in the number of demand resources 112 that are available to turn on. This is due largely to the reliance on lightly-used demand resources 112 to provide peak energy consumption. However, these demand resources 112 are quickly satisfied and become unavailable to turn on. Minimizing the use of these low-use demand resources 112 requires fine control.

Figure 3:
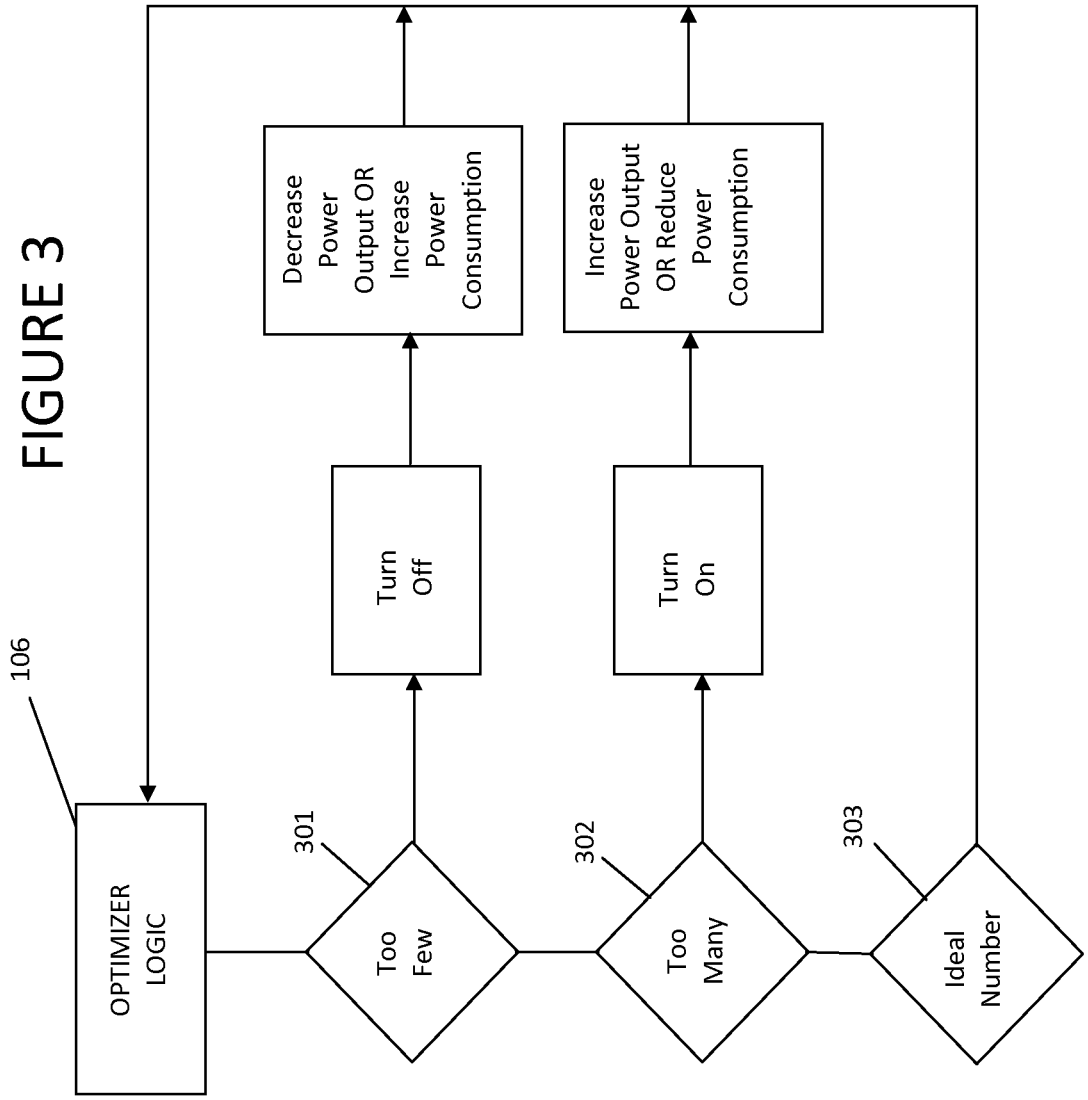
FIG. 3 is a logic flow diagram describing the optimization of available demand resources by selective charging or discharge of coupled energy modulators.

FIG. 3 shows a logic flow diagram of the optimizer logic 106. When the collective energy deficit is too shallow, or the number of demand resources 107 able to turn on is below a target number, the energy modulator 108 at step 301 provides the necessary demand or reduces energy supply. This allows low-priority demand resources 112 to be turned off and reserved for use during peak consumption. When the number of demand resources 112 available to be turned on is above the target range, the energy modulator 108 at step 302 reduces consumption or increases supply. This allows high-priority demand resources 112 to turn on and satisfy the underlying need. When the number of demand resources 112 is on target with an ideal number, as shown at step 303, the level of consumption or supply of the energy modulator 108 will not change.

A large change in the number of demand resources 112, e.g., water heaters, that can be turned on can be achieved with a small change in the collective energy deficit. If the energy consumption required by the power grid control 101 is higher than expected, or the water usage is lower than expected, the number of water heaters available to heat may be greatly reduced. Similarly, the number of available heaters can be actively managed over the short-term by selectively enlarging or shrinking the energy deficit.

One embodiment accomplishes this optimization by assigning a priority to the energy modulator 108 relative to the priority of the fleet 107 of demand resources 112. When the energy optimizer logic 106 determines that the energy modulator 108 is the next highest priority, it is turned on relative to the fleet 107 of demand resources 112. The priority value assigned to the energy modulator 108 is adjusted higher or lower to maintain the target number of energy modulators 108 available to create demand.

In one embodiment, and again with reference to FIG. 1, a battery system 110 may be used as the energy modulator 108 to manage the short-term energy deficit in the fleet 107 of demand resources 112, such as water heaters. The optimizer logic 106 can direct the battery system 110 to charge. The dispatch logic 105 will then turn off a low-use demand resource 112 to maintain the requested power level, and the number of demand resources 112 in fleet 107 that are available to turn on will grow. Conversely, the optimizer logic 106 can command the discharge of the battery system 110. The dispatch logic 105 will then turn on additional demand resources 112 to maintain the requested power level, and the number of demand resources 112 in fleet 107 that are available to turn on will drop.

In this configuration, the optimizer logic 106 directs the charging and discharging of the battery system 110 to manage the collective energy deficit and number of demand resources 112 that are available to be turned on. The charge and discharge of the battery system 110 does not directly follow the control signal.

The optimizer logic 106 also manages the baseline energy consumption level over the short term. If the imbalance between the requested level of energy from the grid and the demand from the fleet 107 of demand resources 112 remains out of balance over the longer term, the baseline must be adjusted. The baseline is the energy consumption midpoint around which the power grid control 101 commands higher or lower consumption. After the optimizer logic 106 determines that the energy modulator 108 is incapable of adequately managing the power levels, the optimizer logic 106 will raise or lower the baseline With further reference to FIG. 1, load banks 109 and/or generators 111 may also be used as an energy modulator 108. A load bank 109 is a device that can consume power for an extended duration by discharging the energy into the environment as waste heat. When the number of demand resources 112 available to be turned on is below target, and the control signal requests additional energy consumption, a load bank 109 can consume power while preserving the ability of the low use demand to turn on during a peak period.

The load bank 109 cannot add energy back to the system. As shown in the logic diagram of FIG. 4, to ensure proper operation, optimizer logic 106 should adjust the baseline at step 401 so that the collective amount of energy consumed by the fleet 107 of demand resources 112 is generally less than that required by the grid, with the load bank 109 providing the difference.

Figure 4:
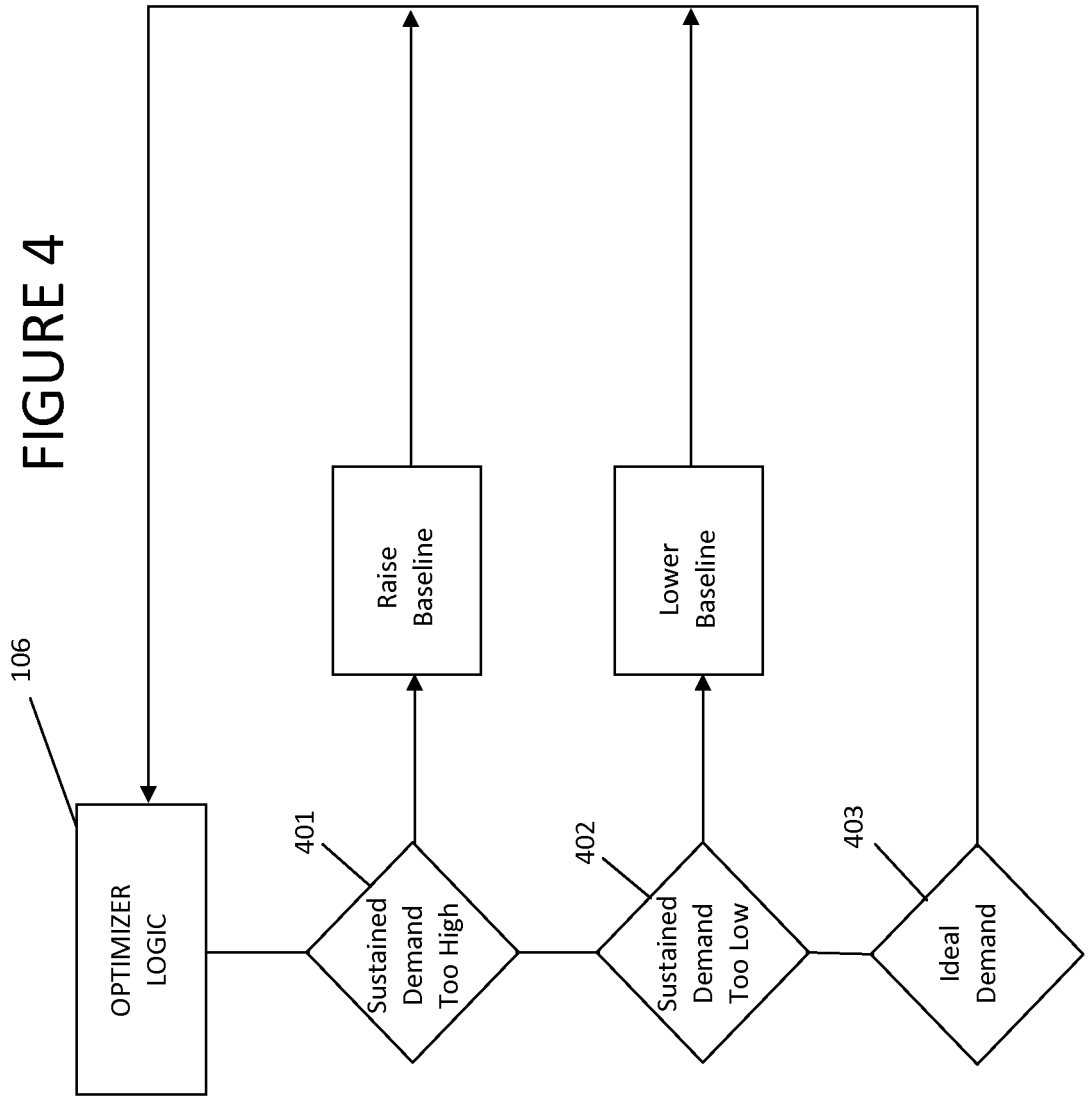
FIG. 4 is a logic flow diagram describing the dynamic adjustment of an energy usage baseline based on the collective state of the demand resources.

Likewise, a generator 111 provides electrical energy for an extended duration by converting a stored fuel source into power. When there is an energy deficit such that there is not enough energy to satisfy the needs of the fleet 107 of demand resources 112, a generator 111 can add energy to the system. This can offset turning off high priority demand resources 112. A generator 111 cannot consume power from the system. With further reference to FIG. 4, to ensure proper operation, optimizer logic 106 should adjust the baseline at step 402 such that the collective amount of energy consumed by the fleet 107 of demand resources 112 is generally more than that which is required by the grid, with the generators 111 making up the difference.

Of course, in the event that the energy deficit of the system provides an ideal demand with respect to the baseline, then at step 403 the optimizer logic 106 maintains the same baseline.

Figure 5:
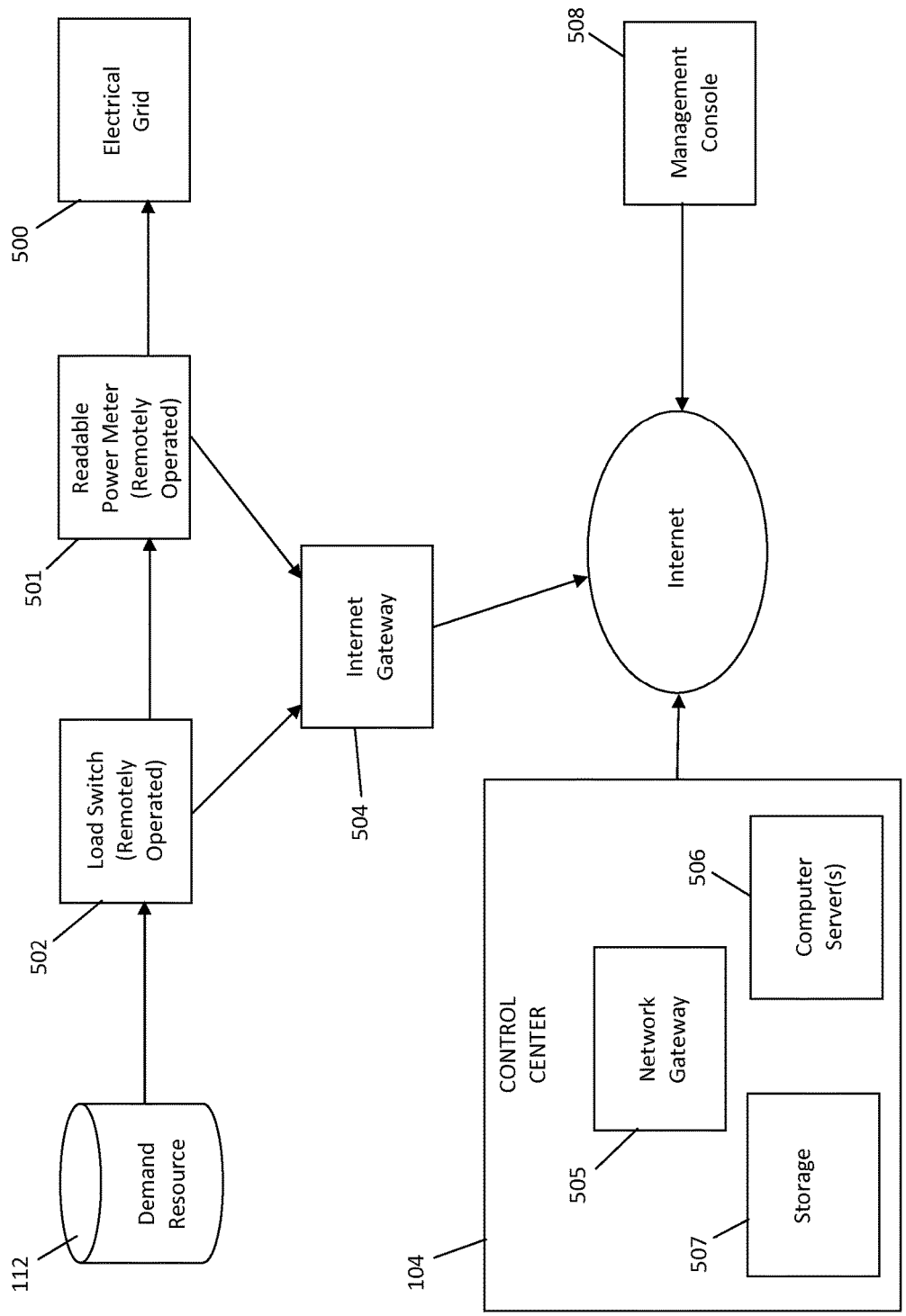
FIG. 5 is a schematic view of the system of FIG. 1 in accordance with further aspects of an embodiment of the invention.

FIG. 5 is a schematic representation of the system described above in accordance with further aspects of an embodiment of the invention. One or more demand resources 112 are connected to the electrical grid 500 through a remotely readable power meter 501 and a remotely operated load switch 502. The load switch 502 and power meter 501 may be in the same physical device, and are elements that are readily commercially available and of known construction to those skilled in the art, such that they are not further detailed here. The load switch 502 and power meter 501 are connected to the control center 104 via an Internet gateway 504. The Internet gateway 504, load switch 502, and power meter 501 may likewise be in the same physical device. The Internet gateway 504 may exchange signals with the control center 104 via the public Internet or private data network. These networks may, by way of non-limiting example, be over Ethernet, WiFi, Cellular, or other suitable network technology.

The control center 104 preferably includes a network gateway 505 and one or more computer servers 506 capable of executing the dispatch logic 105 and optimizer logic 106 (FIG. 1). These servers 506 are in communication with data storage 507 sufficient to maintain current operating state and operating history. The servers 506 may be physically present in control center 104 or may be virtual servers in a computing cloud system.

The network gateway 505 of control center 104 supports secure communication to the Internet gateways 504 (and thus the demand resources 112 in communication with such Internet gateways 504), and optionally one or more management consoles 508 configured to provide operational management and adjustment capabilities. As shown in FIG. 5, management console 508 may be remote from control center 104 and communicate with the rest of the system across a network such as the Internet, but may likewise be provided as a component of the control center without departing from the spirit and scope of the invention.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. An energy regulation system, comprising:
   a plurality of demand resources;
   a metering load controller in communication with each demand resource in the plurality of demand resources;
   an energy modulator consumes power on demand and to produce power on demand; and
   a system controller in communication with said metering load controller, said energy modulator, and an energy source;
   wherein said system controller further comprises executable computer instructions to:
   cause said metering load controller to regulate power of one or more of said demand resources;
   upon a determination that a current number of demand resources available to be powered is below a target number, cause said energy modulator to increase energy consumption or reduce energy supply; and
   upon a determination that said current number of demand resources available to be powered is above a target range, cause said energy modulator to reduce energy consumption or increase energy supply;
   wherein control of said energy modulator by said system controller regulates said current number of demand resources available to be powered to meet a baseline energy demand.

2. The energy regulation system of claim 1, wherein said baseline energy demand further comprises a value representative of an anticipated energy need for said plurality of demand resources as a whole over a defined time period.

3. The energy regulation system of claim 1, wherein said system controller further comprises executable computer instructions that maintain said plurality of demand resources in a state having a collective energy deficit in which said energy regulation system is regulated to consume less energy than a baseline amount of energy over a period of time.

4. The energy regulation system of claim 3, wherein said system controller further comprises executable computer instructions that power a number of unpowered demand resources calculated to reduce said collective energy deficit in response to a signal to said energy regulation system to consume more energy.

5. The energy regulation system of claim 4, wherein said executable computer instructions power said number of unpowered demand resources further first power one or more demand resources calculated as being capable of consuming the most power.

6. The energy regulation system of claim 4, wherein said system controller further comprises executable computer instructions that determine a priority for powering said number of unpowered demand resources, wherein said priority is calculated from historical power consumption data for said plurality of demand resources.

7. The energy regulation system of claim 1, wherein said system controller further comprises executable computer instructions that maintain, in combination, said plurality of demand resources and said energy modulator in a state having a collective energy deficit in which said energy regulation system is regulated to consume less energy than said baseline amount of energy over a period of time.

8. The energy regulation system of claim 1, wherein the demand resource is selected from the group consisting of a water heater, refrigeration equipment, a heat pump, an air conditioner, an electric clothes dryer, and combinations thereof.

9. The energy regulation system of claim 1, wherein the energy modulator further comprises a battery system.

10. The energy regulation system of claim 1, wherein the system controller further comprises executable instructions that cause the energy modulator to provide energy to one of said demand resources when the one of said demand resources has capacity to accept energy, and to cause the energy modulator to store energy when the one of said demand resources does not have capacity to accept additional energy.

11. The energy regulation system of claim 1, wherein the plurality of demand resources and the energy modulator work in combination and to respond to a single frequency regulation signal from the system controller.

12. The energy regulation system of claim 11, wherein the system further operates at a higher power level equal to a sum of a capacity of the energy modulator and a capacity of the demand resources.

13. The energy regulation system of claim 1, wherein the system controller further causes said energy regulation system to achieve a higher power consumption level than said plurality of demand resources alone.

14. The energy regulation system of claim 11, wherein the system controller is further causes said energy regulation system to achieve a higher power consumption level than said plurality of demand resources alone.

15. A method for operating an energy regulation system, comprising the steps of:
   providing a metering load controller and placing said metering load controller in communication with each of a plurality of demand resources;
   providing an energy modulator that consumes power on demand and to produce power on demand; and
   providing a system controller in communication with said metering load controller, said energy modulator, and an energy source, wherein said system controller further comprises executable computer instructions to:
      cause said metering load controller to regulate power of one or more of said demand resources;
      upon a determination that a current number of demand resources available to be powered is below a target number, cause said energy modulator to increase energy consumption or reduce energy supply; and
      upon a determination that a current number of demand resources available to be powered is above a target range, cause said energy modulator to reduce energy consumption or increase energy supply;
   wherein control of said energy modulator by said system controller regulates a current number of demand resources available to be powered to meet said a baseline energy demand.

16. The method of claim 15, further comprising a step of maintaining said plurality of demand resources in a state having a collective energy deficit in which said energy regulation system is regulated to consume less energy than a baseline amount of energy over a period of time.

17. The method of claim 16, further comprising a step of powering a number of unpowered demand resources calculated to reduce said collective energy deficit in response to a signal to said energy regulation system to consume more energy.

* * * * *